Patented Aug. 11, 1953

2,648,664

UNITED STATES PATENT OFFICE 2,648,664

4,4,6-TRIMETHYL-2-(1-HYDROXYETHYL)-5,6-DIHYDRO-1,3-4H-OXAZINE

William P. Ratchford, Philadelphia, Pa., assignor to the United States of America as represented by the Secretary of Agriculture No Drawing. Application March 23, 1951, Serial No. 217,281

3 Claims. (Cl. 260—244)

(Granted under Title 35, U. S. Code (1952), sec. 266)

The invention herein described may be manufactured and used by or for the Government of the United States of America for governmental purposes throughout the world without the payment to me of any royalty thereon.

This invention relates to the new and useful material, 4,4,6-trimethyl-2-(1-hydroxyethyl)-5,6-dihydro-1,3-4H-oxazine having the formula

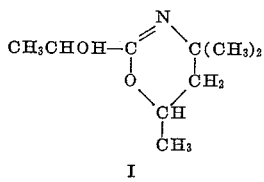

I

I have found that this compound can be obtained by forming a mixture of methyl, ethyl or propyl lactate with about an equimolecular amount, preferably a slight excess, of 2-amino-2-methylpentanol-4, and maintaining the resulting solution at room temperature (about 25° C.), for example, until the reaction has proceeded substantially to completion, which is usually attained within a few days. The reaction product is then recovered by distillation.

The oxazine is a basic compound with an alcoholic hydroxyl group. Hence the latter group can be acylated, as by a long-chain aliphatic carboxylic acid; the salts of this ester should be water-soluble to give soapy solutions with wetting-out, emulsifying and dispersing properties. Similar compounds have been disclosed by Jayne and Day, U. S. 2,329,619, September 14, 1943.

Moreover the oxazine is readily hydrolyzed by an equimolecular amount of water to give N-(1,1-dimethyl-3-hydroxybutyl)-lactamide:

Thus the oxazine is also a valuable intermediate for purification of N-(1,1-dimethyl-3-hydroxybutyl)-lactamide.

The latter, having two hydroxyl groups, may be considered a glycol. As such, it may be acylated to give esters which plasticize cellulose resins and synthetic resins of the polyvinyl chloride-acetate type. Such esters are the diacetate, which plasticizes cellulose acetate; the dipropionate, which plasticizes cellulose acetate and ethyl cellulose; and the di-2-ethylhexanoate, which plasticizes ethyl cellulose and polyvinyl chloride-acetate.

The lactamide can also be reacted with polycarboxylic acids to make alkyd resins.

Thus, aside from its own usefulness, the oxazine affords a means for transporting the valuable lactamide in a concentrated and liquid form. The oxazine is equivalent to about 110 percent of the lactamide.

The following example illustrates the invention:

A mixture consisting of 104 g. methyl lactate and 128 g. of 2-amino-2-methylpentanol-4, was allowed to stand at room temperature for 7 days. At the end of this period the extent of aminolysis was 97 percent as determined by titration of a sample of the reaction mixture with 0.1 N hydrochloric acid to the grey transition point of a mixed indicator consisting of 4 parts 0.1 percent methyl red and 1 part 0.1 percent methylene blue in 95 percent alcohol. The reaction mixture was then distilled first at atmospheric pressure to remove a methanol fraction, and then under reduced pressure to remove water. The 4,4,6-trimethyl-2-(1-hydroxyethyl)-5,6-dihydro-1,3,4H-oxazine was next collected at 95–105° C./30 mm., as a mobile colorless liquid, neutralization equivalent 171. The yield was 90 percent of the theoretical. The product so obtained on being combined with an equimolecular amount of water at room temperature is quantitatively converted to N-1,1,-dimethyl-3-hydroxybutyllactamide, M. P., 94–94.5° C.

If preferred, the oxazine need not be isolated from the reaction mixture. After removal of methanol and water, the residual oxazine may be stored, then the lactamide obtained subsequently by addition of water.

The oxazine may also be designated 4,4,6-trimethyl-2-(1-hydroxyethyl)-5,6-dihydro,1,3,4-oxazine.

Having thus described my invention, I claim:

1. The compound having the formula:

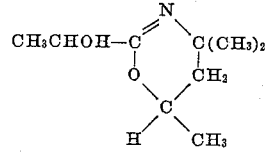

2. The process comprising reacting methyl lactate with 2-amino-2-methylpentanol-4 to produce 4,4,6-trimethyl-2-(1-hydroxyethyl)-5,6-dihydro-1,3,4H-oxazine.

3. The process of claim 2 in which the reaction is at about 25° C.

WILLIAM P. RATCHFORD.

References Cited in the file of this patent

UNITED STATES PATENTS

| Number | Name | Date |
|---|---|---|
| 2,326,732 | Fisher | Aug. 10, 1943 |
| 2,329,619 | Jayne et al. | Sept. 14, 1943 |
| 2,548,156 | Gresham et al. | Apr. 10, 1951 |
| 2,593,888 | Jones | Apr. 22, 1952 |

FOREIGN PATENTS

| Number | Country | Date |
|---|---|---|
| 615,006 | Great Britain | Dec. 3, 1948 |